(12) United States Patent
Masuzawa

(10) Patent No.: US 11,125,965 B2
(45) Date of Patent: Sep. 21, 2021

(54) LENS UNIT

(71) Applicant: FUJIFILM Corporation, Tokyo (JP)

(72) Inventor: Tomonari Masuzawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 16/282,326

(22) Filed: Feb. 22, 2019

(65) Prior Publication Data

US 2019/0187402 A1 Jun. 20, 2019

Related U.S. Application Data

(63) Continuation of application No. PCT/JP2017/021370, filed on Jun. 8, 2017.

(30) Foreign Application Priority Data

Sep. 23, 2016 (JP) .............................. JP2016-185882

(51) Int. Cl.
*G02B 7/02* (2021.01)

(52) U.S. Cl.
CPC ............ *G02B 7/026* (2013.01); *G02B 7/021* (2013.01); *G02B 7/022* (2013.01); *G02B 7/028* (2013.01)

(58) Field of Classification Search
CPC ........ G02B 7/026; G02B 7/022; G02B 7/021; G02B 7/028
USPC ........................................................ 359/830
See application file for complete search history.

(56) References Cited

U.S. PATENT DOCUMENTS

| | | | |
|---|---|---|---|
| 7,419,315 B2 | 9/2008 | Hirata et al. | |
| 7,656,596 B2 | 2/2010 | Matsumoto | |
| 8,456,769 B2 | 6/2013 | Teraoka et al. | |
| 10,104,272 B2 | 10/2018 | Morishima et al. | |
| 2004/0252383 A1 | 12/2004 | Hamada | |
| 2006/0114579 A1* | 6/2006 | Shibuya | G02B 7/028 359/811 |
| 2012/0019905 A1* | 1/2012 | Teraoka | G02B 7/028 359/356 |

FOREIGN PATENT DOCUMENTS

| | | |
|---|---|---|
| CN | 1808201 | 7/2006 |
| CN | 101052909 | 10/2007 |
| CN | 101189542 | 5/2008 |
| CN | 101329438 | 12/2008 |
| CN | 102227663 | 10/2011 |
| CN | 104704412 | 6/2015 |

(Continued)

OTHER PUBLICATIONS

"Office Action of China Counterpart Application", dated Sep. 3, 2020, with English translation thereof, pp. 1-13.

(Continued)

*Primary Examiner* — Mohammed A Hasan
(74) *Attorney, Agent, or Firm* — JCIPRNET

(57) ABSTRACT

A lens unit 10 includes: a second lens 14 that is received in a lens barrel 18; and a lens holding ring 20 that is formed in a shape of a ring, is fitted into the lens barrel 18, includes lens receiving portions 24AS formed on an inner peripheral surface 24A thereof at three or more different positions in a circumferential direction, and allows the second lens 14 to be fitted into the lens holding ring while the second lens 14 is received by the lens receiving portions 24AS.

13 Claims, 8 Drawing Sheets

(56) References Cited

FOREIGN PATENT DOCUMENTS

| | | |
|---|---|---|
| JP | H04166905 | 6/1992 |
| JP | 2000019371 | 1/2000 |
| JP | 2007188034 | 7/2007 |
| JP | 2008111932 | 5/2008 |
| JP | 2009086465 | 4/2009 |
| JP | 2010217280 | 9/2010 |
| JP | 2012078610 | 4/2012 |
| JP | 2014170123 | 9/2014 |
| WO | 2010061604 | 6/2010 |

OTHER PUBLICATIONS

"International Preliminary Report on Patentability (Form PCT/IPEA/409) of PCT/JP2017/021370," completed on Apr. 19, 2018, with English translation thereof, pp. 1-6.

"International Search Report (Form PCT/ISA/210) of PCT/JP2017/021370," dated Aug. 15, 2017, with English translation thereof, pp. 1-5.

"Written Opinion of the International Searching Authority (Form PCT/ISA/237) of PCT/JP2017/021370," dated Aug. 15, 2017, with English translation thereof, pp. 1-8.

Office Action of China Counterpart Application, with English translation thereof, dated Apr. 16, 2021, pp. 1-18.

\* cited by examiner

LENS UNIT

CROSS-REFERENCE TO RELATED APPLICATIONS

This application is a continuation application of International Application No. PCT/JP2017/021370, filed on Jun. 8, 2017, which is incorporated herein by reference in its entirety.

BACKGROUND

Technical Field

The present disclosure relates to a lens unit.

Related Art

There is a case where a lens is press-fitted to a lens holding ring and the lens holding ring is fitted into a lens barrel in a lens unit so that the lens is held in the lens barrel (for example, see JP2014-170123A).

In a case where the lens is to be press-fitted to the lens holding ring so that the lens is held in the lens barrel through the lens holding ring as described above, the lens is subjected to a force applied from the lens holding ring. Further, even in a case where the lens holding ring is to be press-fitted to the lens barrel, the lens is affected by a force applied to the lens holding ring from the lens barrel. Accordingly, it is thought that the assemblability of the lens deteriorates due to a variation in the inner diameter of the lens holding ring during molding, and the like.

SUMMARY

The disclosure has been made in consideration of the above-mentioned circumstances, and an object of the invention is to provide a lens unit that can improve the assemblability of a lens to be received in a lens barrel.

A lens unit according to a first aspect comprises: a lens that is received in a lens barrel; and a lens holding ring that is formed in a shape of a ring, is fitted to an inner periphery of the lens barrel, includes lens receiving portions formed on an inner peripheral wall thereof at three or more different positions in a circumferential direction, and allows the lens to be fitted to an inner periphery thereof while the lens is received by the lens receiving portions.

In the lens unit according to the first aspect, the lens holding ring is fitted to the inner periphery of the lens barrel. The lens is fitted to the lens holding ring while being received by the lens receiving portions formed on the inner peripheral wall of the lens holding ring. The lens receiving portions are formed on the inner peripheral wall of the lens holding ring at three or more different positions in the circumferential direction. Accordingly, the lens and the lens holding ring are fitted to each other at multiple points that are arranged at intervals in the circumferential direction of the lens. Therefore, since a contact area between the lens and the lens holding ring is smaller than that in a case where the lens and the lens holding ring are in complete contact with each other in the circumferential direction, the lens is easily received in the lens holding ring.

Further, even though the lens holding ring is distorted due to a force applied from the lens barrel, an insertion force required to assemble the lens with the lens holding ring can be made smaller than that in a case where the lens is received by the entire inner peripheral surface. Accordingly, the assemblability of the lens can be improved.

In a lens unit according to a second aspect, the lens includes a lens portion of which an outer periphery is fitted to the lens receiving portions of the lens holding ring and a protruding portion that protrudes outward from the lens portion in a radial direction, and a positioning surface, which is to be in contact with the protruding portion in an optical axis direction, is formed on the lens holding ring.

In the lens unit according to the second aspect, the outer periphery of the lens portion is fitted to the receiving portions of the lens holding ring and the protruding portion is in contact with the positioning surface of the lens holding ring in the optical axis direction. Accordingly, the lens can be positioned in the optical axis direction by the positioning surface of the lens holding ring.

In a lens unit according to a third aspect, a contact surface, which is in contact with an adjacent member and defines an interval between the adjacent member and the lens in the optical axis direction, is formed on a surface of the lens holding ring opposite to the positioning surface in the optical axis direction.

According to the lens unit of the third aspect, an interval between the lens and the adjacent member can be defined by the contact surface.

In a lens unit according to a fourth aspect, the inner peripheral wall of the lens holding ring is formed in a polygonal shape in a case where the inner peripheral wall of the lens holding ring is viewed in the optical axis direction.

Since the inner peripheral wall of the lens holding ring is formed in a polygonal shape in the lens unit according to the fourth aspect, the outer periphery of the lens and the lens receiving portions are in line contact with each other in an axial direction. Accordingly, even though the lens holding ring is distorted due to a force applied from the lens barrel, resistance to be generated during assembly is made smaller than that in the case of a surface contact structure where the outer periphery of the lens is received by a curved surface. Further, since the lens is in line contact with the lens holding ring in the insertion direction of the lens, the assemblability of the lens can be improved.

In a lens unit according to a fifth aspect, a thermal expansion coefficient of the lens holding ring in the optical axis direction is lower than a thermal expansion coefficient of the lens holding ring in a direction orthogonal to an optical axis.

Since the thermal expansion coefficient of the lens holding ring in the optical axis direction is low in the lens unit according to the fifth aspect, an influence on a reduction in resolution can be reduced by a reduction in the amount of change of the lens holding ring in the optical axis direction caused by thermal expansion.

In a lens unit according to a sixth aspect, the lens holding ring is made of a resin containing inorganic fiber.

According to the lens unit of the sixth aspect, since the lens holding ring is made of a resin containing inorganic fiber, the strength of the lens holding ring can be increased. Further, anisotropy can be given to a thermal expansion coefficient by the orientation of inorganic fiber.

In a lens unit according to a seventh aspect, the lens holding ring includes a gate mark for molding, and the lens receiving portions are arranged at positions symmetric with respect to the gate mark in the circumferential direction.

According to the lens unit of the seventh aspect, since the lens receiving portions are arranged at positions symmetric with respect to the gate mark in the circumferential direction, the force to be applied to the lens from the lens receiving portion can be made uniform in the circumferential direction.

In a lens unit according to an eighth aspect, the inner periphery of the lens barrel and an outer periphery of the lens holding ring are in contact with each other at three or more different positions in the circumferential direction.

According to the lens unit of the eighth aspect, since the outer periphery of the lens holding ring is in contact with the inner periphery of the lens barrel at three or more different positions in the circumferential direction, an insertion force required to assemble the lens holding ring with the lens barrel can be made smaller than that in a case where the lens holding ring is received by the entire inner periphery. Accordingly, the assemblability of the lens holding ring can be improved.

In a lens unit according to a ninth aspect, an inner peripheral wall of the lens barrel is formed in a polygonal shape in a case where the inner peripheral wall of the lens barrel is viewed in the optical axis direction.

Since the inner peripheral wall of the lens barrel is formed in a polygonal shape in the lens unit according to the ninth aspect, the inner peripheral wall of the lens barrel is in line contact with the outer periphery of the lens holding ring. Accordingly, since the distortion of the lens holding ring, which is caused in a case where the lens holding ring is subjected to a force applied from the lens barrel, can be suppressed, resistance to be generated during assembly can be made smaller than that in the case of a surface contact structure where the outer periphery of the lens holding ring is received by a curved surface. Therefore, the assemblability of the lens holding ring can be improved.

In a lens unit according to a tenth aspect, the lens receiving portions and fitting positions where the inner periphery of the lens barrel and the lens holding ring are fitted to each other are arranged at different positions in the circumferential direction.

Since fitting portions between the lens barrel and the lens holding ring and fitting portions between the lens holding ring and the lens are shifted from each other in the circumferential direction in the lens unit according to the tenth aspect, positions where the lens holding ring is subjected to a force applied from the lens barrel are different from positions where the lens is subjected to a force applied from the lens holding ring. Accordingly, since it is difficult for a force, which is applied from the lens barrel, to act on the lens, resistance to be generated during the assembly of the lens can also be reduced.

In a lens unit according to an eleventh aspect, the lens barrel is made of a resin containing inorganic fiber.

Since the lens barrel is made of a resin containing inorganic fiber in the lens unit according to the eleventh aspect, the strength of the lens barrel can be increased. Further, the degree of freedom in a shape design is improved, and anisotropy can be given to a thermal expansion coefficient by the orientation of inorganic fiber.

In a lens unit according to a twelfth aspect, the lens unit is an in-vehicle lens unit or a monitoring lens unit.

Since the lens unit according to the twelfth aspect is an in-vehicle lens unit or a monitoring lens unit, there is a case where the lens unit is exposed to high temperature. However, even though the lens unit is exposed to high temperature and the lens is expanded due to heat, it can be difficult for the lens to be subjected to a force applied from the lens barrel.

According to the disclosure, it is possible to improve the assemblability of a lens to be received in a lens barrel.

DETAILED DESCRIPTION

First Embodiment

Figure 1:
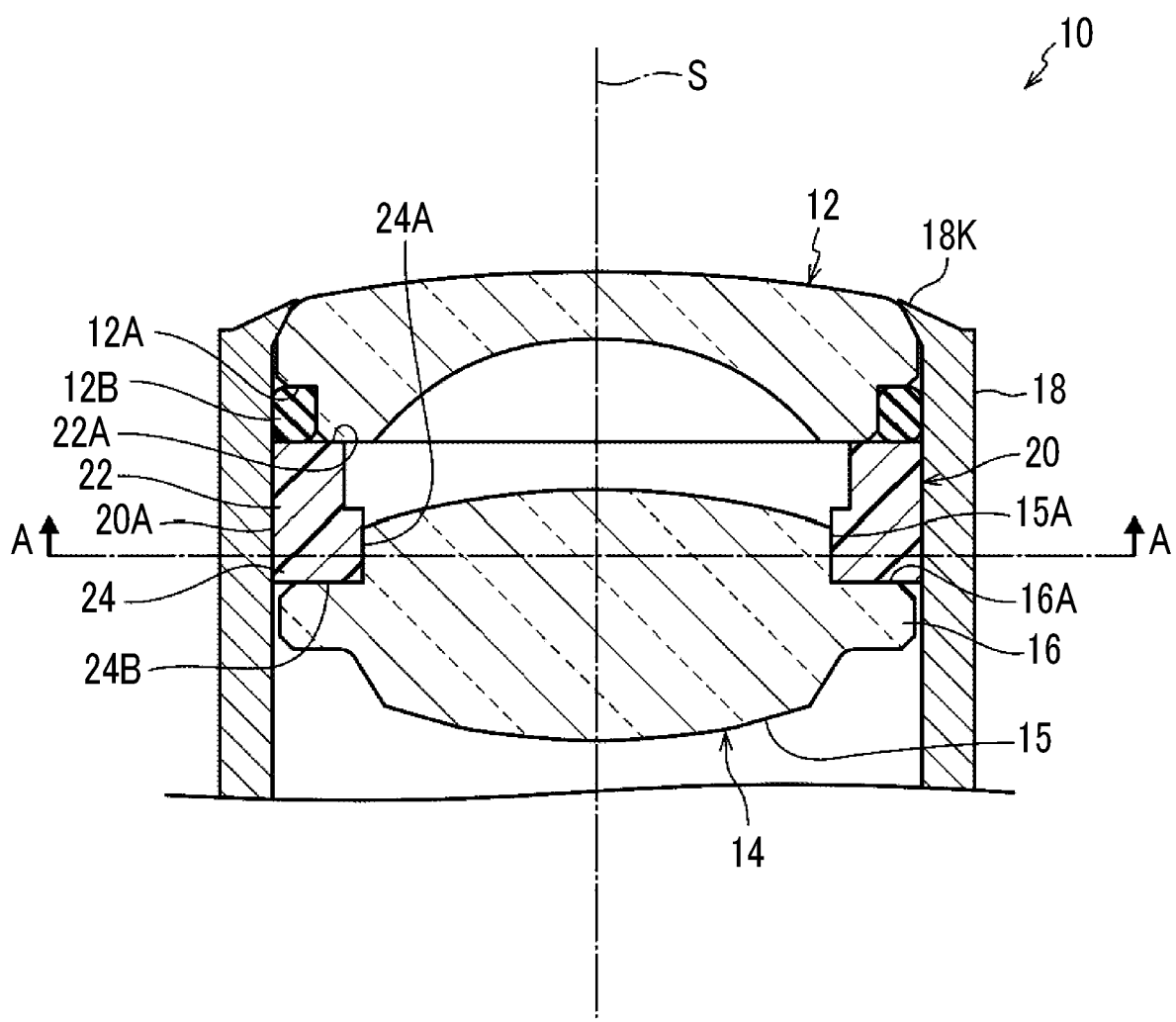
FIG. 1 is a longitudinal sectional view showing main components of a lens unit according to a first embodiment.

A first embodiment will be described below with reference to drawings.

Components having the same function will be denoted in drawings by the same reference numerals, and the description thereof will be appropriately omitted. Further, S to be appropriately shown in each drawing denotes an optical axis, and a direction along the optical axis S will be referred to as an optical axis direction.

As shown in FIG. 1, a lens unit 10 according to this embodiment includes a first lens 12, a second lens 14, a lens barrel 18 that receives the first and second lenses 12 and 14 and is made of a resin, and a lens holding ring 20 that holds the second lens 14. A plurality of lenses are received in the lens barrel 18 separately from the first and second lenses 12 and 14, so that an optical system is formed. Further, an upper side in FIG. 1 is an object side and a lower side in FIG. 1 is an image side. An imaging element (not shown), such as a complementary metal oxide semiconductor (CMOS) image sensor or a charge coupled device (CCD) image sensor, is disposed closer to the image side than the lens unit 10.

(Structure of Lens)

The first lens 12 is formed in a substantially circular shape in a case where the first lens 12 is viewed in the optical axis direction, and the surface of the first lens 12 facing the object side is curved to be convex and the surface of the first lens 12 facing the image side is curved to be concave. A groove 12A is formed on the outer periphery of the first lens 12 facing the image side, and an O-ring 12B is mounted in the groove 12A. The first lens 12 is made of, for example, glass.

The second lens 14 is disposed on the side of the first lens 12 facing the image side, and is formed in a substantially circular shape in a case where the second lens 14 is viewed in the optical axis direction. The second lens 14 includes a lens portion 15 and a protruding portion 16. The lens portion 15 forms the optical surface of the second lens 14, and the surface of the lens portion 15 facing the object side is curved to be convex and the surface of the lens portion 15 facing the image side is curved to be convex. The protruding portion 16 protrudes outward in a radial direction from a middle portion of the lens portion 15 in the optical axis direction, and includes a protruding surface 16A facing the object side. An outer peripheral surface 15A is formed on the outer periphery of a portion of the lens portion 15 that is closer to the object side than the protruding portion 16. The lens portion 15 and the protruding portion 16 are formed integrally with each other. The second lens 14 is made of, for example, glass.

(Structure of Lens Holding Ring)

The lens holding ring 20 is formed in the shape of a ring of which both end portions in the optical axis direction are opened, and is formed by resin molding.

Here, the lens holding ring 20 can be made of, for example, a resin containing inorganic fiber. In a case where the lens holding ring 20 is made of so-called fiber-reinforced plastic containing inorganic fiber and the like, the mechanical strength of the lens holding ring 20 is increased. For example, at least one selected from a group consisting of polyamide, polyacetal, polycarbonate, polyphenylene ether, polybutylene terephthalate, polyethylene terephthalate, polyethylene, syndiotactic polystyrene, polysulfone, polyethersulfone, polyphenylene sulfide, polyarylate, polyamide imide, polyetherimide, polyetheretherketone, acrylonitrile butadiene styrene, polyolefin, and modified polymers thereof; polymer alloy containing at least one selected from the group; or the like can be used as the resin to be used. Glass fiber or carbon fiber, fiber-reinforced plastic, an inorganic filler, and the like can be used as the fiber.

Further, it is preferable that the thermal expansion coefficient of the lens holding ring 20 in the optical axis direction is lower than the thermal expansion coefficient of the lens holding ring 20 in a direction orthogonal to the optical axis. The reason for this is that an influence on a reduction in resolution can be reduced by a reduction in the amount of change of the lens holding ring in the optical axis direction caused by thermal expansion. In a case where the orientation direction of the fiber is set to a direction along the optical axis, the thermal expansion coefficient of the lens holding ring 20 in the optical axis direction can be made lower than the thermal expansion coefficient of the lens holding ring 20 in the direction orthogonal to the optical axis.

The lens holding ring 20 includes an interval defining portion 22 and a holding portion 24 that are arranged in this order from the object side. The interval defining portion 22 is formed in the shape of a ring, and includes a contact surface 22A facing the object side. The contact surface 22A is in contact with the surface of the first lens 12 facing the image side. The first lens 12 is an adjacent member that is adjacent to the second lens 14 with the lens holding ring 20 interposed therebetween in the optical axis direction.

The holding portion 24 is formed integrally with the interval defining portion 22, and an inner peripheral surface 24A of the holding portion 24 is disposed on the inner side than the inner peripheral surface of the interval defining portion 22 in the radial direction. A positioning surface 24B, which faces the image side, is formed on the surface of the holding portion 24 facing the image side. The positioning surface 24B is in contact with the protruding surface 16A. Since the interval defining portion 22 and the holding portion 24 have the same outer diameter, an outer peripheral surface 20A of the lens holding ring 20 is formed so that the outer peripheral surface of the interval defining portion 22 is flush with the outer peripheral surface of the holding portion 24.

Figure 2:
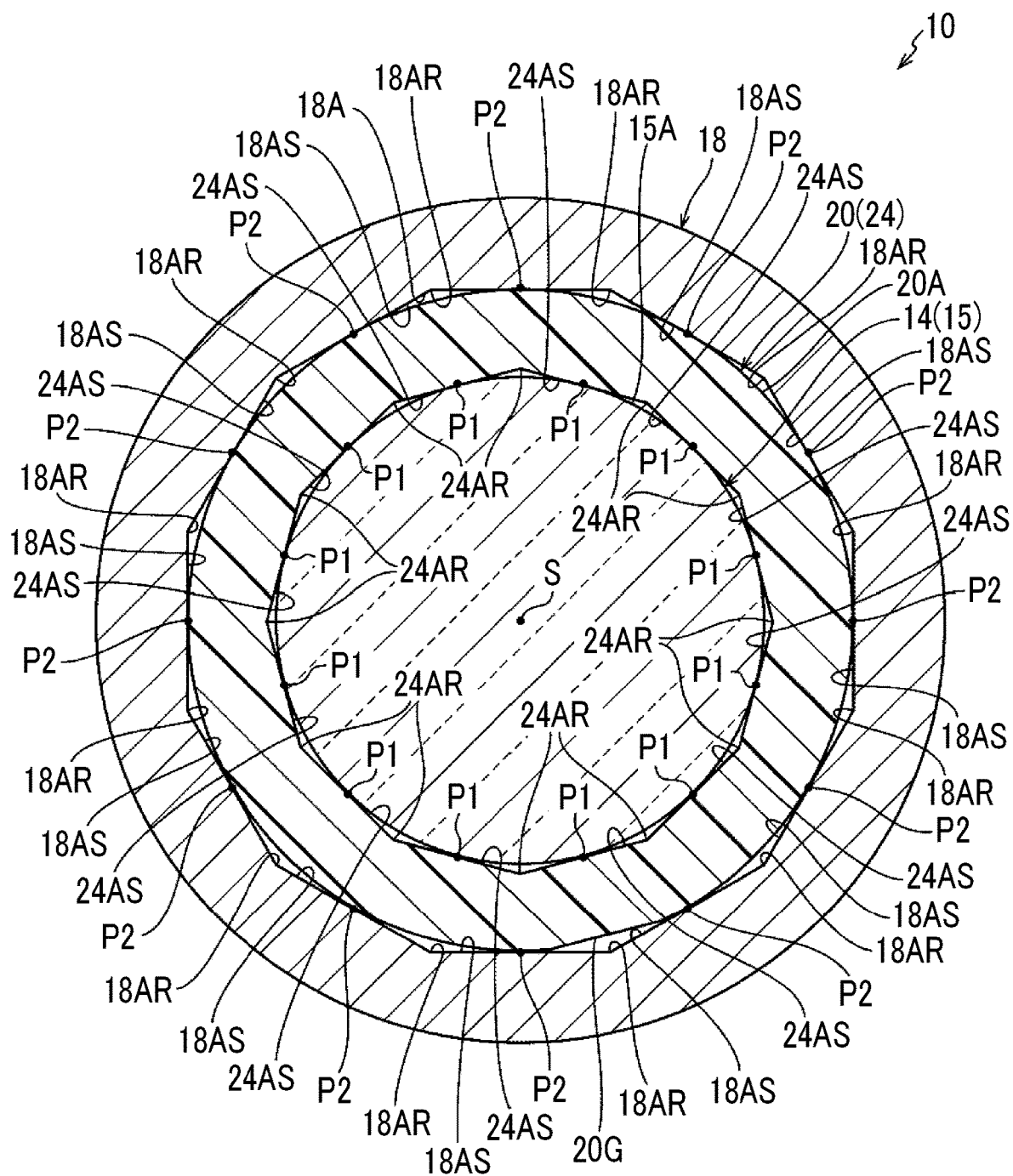
FIG. 2 is a cross-sectional view enlarging a cross section taken along line A-A of FIG. 1.

As shown in FIG. 2, the inner peripheral surface 24A is formed in a polygonal shape in a case where the inner peripheral surface 24A is viewed in the optical axis direction. In this embodiment, the inner peripheral surface 24A is formed substantially in the shape of, for example, a regular dodecagon in a case where the inner peripheral surface 24A is viewed in the optical axis direction. The inner peripheral surface 24A includes twelve lens receiving portions 24AS that form the respective sides of the regular dodecagon, and a corner 24AR is formed between the adjacent lens receiving portions 24AS. The lens receiving portion 24AS is formed of a flat surface.

A gate mark 20G, which has been disposed at a gate portion for molding during molding, is formed on the outer peripheral surface of the lens holding ring 20. It is preferable that the lens receiving portion 24AS are arranged at positions symmetric with respect to the gate mark 20G in a circumferential direction. The reason for this is that the lens holding ring 20 is likely to be distorted due to a force applied asymmetrically with respect to the gate mark 20G.

The gate mark of this embodiment is not limited to a case where a part of the trace of an introduction portion (gate), which introduces a melted resin material into a mold during the injection molding for the lens holding ring, remains on the molded lens holding ring, and also includes a case where the trace of the gate of the lens holding ring is cut and removed not to remain. Further, a case where only one gate is provided will be described in this embodiment by way of example, but a resin material may be introduced from a plurality of gates. In this case, if a plurality of gate marks are formed, for example, two gate marks are provided, another gate mark is formed at a position that is shifted from the gate mark 20G in the circumferential direction by an angle of 180°.

The lens portion 15 is fitted into the holding portion 24. The outer peripheral surface 15A of the lens portion 15 is in contact with the respective twelve lens receiving portions 24AS, and portions where the outer peripheral surface 15A is in contact with the respective twelve lens receiving portions 24AS are holding positions P1. That is, the lens portion 15 is fitted into the holding portion 24 while being linearly received at the holding positions P1 of the lens receiving portions 24AS.

(Structure of Lens Barrel)

The lens barrel 18 is formed substantially in the shape of a cylinder of which both end portions in the optical axis direction are opened, and is formed by resin molding. A caulking portion 18K subjected to thermal caulking is formed at an end portion of the lens barrel 18 facing the object side, and the separation of components of the optical system from the lens barrel 18 is suppressed by the caulking portion. Further, a pressing portion (not shown) is provided at an end portion of the lens barrel 18 facing the image side, and a through-hole having the function of an optical stop is formed in the pressing portion.

Here, the lens barrel 18 can be made of, for example, a resin containing inorganic fiber. In a case where the lens barrel 18 is made of so-called inorganic fiber-reinforced plastic containing inorganic fiber and the like, the mechanical strength of the lens barrel 18 is increased. For example, at least one selected from a group consisting of polyamide, polyacetal, polycarbonate, polyphenylene ether, polybutylene terephthalate, polyethylene terephthalate, polyethylene, syndiotactic polystyrene, polysulfone, polyethersulfone, polyphenylene sulfide, polyarylate, polyamide imide, polyetherimide, polyetheretherketone, acrylonitrile butadiene styrene, polyolefin, and modified polymers thereof; polymer alloy containing at least one selected from the group; or the like can be used as the resin to be used. Glass fiber or carbon fiber, fiber-reinforced plastic, an inorganic filler, and the like can be used as the fiber.

The lens barrel 18 requires a high light-shielding property and a high light-absorbing property. It is preferable that the resin to be used is black, and it is preferable that the resin material contains a black pigment or a black dye. In a case where the lens barrel 18 is made of the resin material containing a black pigment or a black dye, the inner wall surface of the lens barrel 18 can be made black. Accordingly, the reflection of visible light from the inner wall surface of the lens barrel 18 can be more effectively suppressed.

Further, it is preferable that the thermal expansion coefficient of the lens barrel 18 in the optical axis direction is lower than the thermal expansion coefficient of the lens barrel 18 in a direction orthogonal to the optical axis. The reason for this is that an influence on a reduction in resolution can be reduced by a reduction in the amount of change of the lens barrel in the optical axis direction caused by thermal expansion. In a case where the orientation direction of the fiber is set to a direction along the optical axis, the thermal expansion coefficient of the lens barrel 18 in the optical axis direction can be made lower than the thermal expansion coefficient of the lens barrel 18 in the direction orthogonal to the optical axis.

Furthermore, the lens barrel 18 may be made of metal.

As shown in FIG. 2, an inner peripheral surface 18A of the lens barrel 18 is formed in a polygonal shape in a case where the inner peripheral surface 18A is viewed in the optical axis direction. In this embodiment, the inner peripheral surface 18A is formed substantially in the shape of, for example, a regular dodecagon in a case where the inner peripheral surface 18A is viewed in the optical axis direction. The inner peripheral surface 18A includes twelve holding ring-receiving portions 18AS that form the respective sides of the regular dodecagon, and a corner 18AR is formed between the adjacent holding ring-receiving portions 18AS. The holding ring-receiving portion 18AS is formed in a flat shape.

The first lens 12, the lens holding ring 20, and the second lens 14 are received in the lens barrel 18. The first lens 12 is disposed at an end portion of the lens barrel 18 facing the object side, and a gap between the first lens 12 and the inner peripheral surface 18A of the lens barrel 18 is sealed by the O-ring 12B that is inserted into the groove 12A.

The lens holding ring 20 is fitted into the lens barrel 18 in a state where the lens portion 15 is fitted into the holding portion 24. The lens receiving portions 24AS of the lens holding ring 20 and the twelve holding ring-receiving portions 18AS of the lens barrel 18 are arranged at different positions (shifted positions) in the circumferential direction. In this embodiment, each corner 18AR and each corner 24AR are disposed at positions that are shifted from each other around the optical axis by an angle of 15°. The outer peripheral surface 20A of the lens holding ring 20 is in contact with the respective twelve holding ring-receiving portions 18AS, and portions where the outer peripheral surface 20A is in contact with the respective twelve holding ring-receiving portions 18AS are holding positions P2. That is, the lens holding ring 20 is fitted into the lens barrel 18 while being linearly received at the holding positions P2 of the holding ring-receiving portions 18AS. The holding positions P1 and the holding positions P2 are arranged at positions that are shifted from each other around the optical axis by an angle of 15°.

The contact surface 22A of the lens holding ring 20 is in contact with the surface of the first lens 12 facing the image side. The outer peripheral surface of the protruding portion 16 of the second lens 14 and the inner peripheral surface 18A of the lens barrel 18 are spaced from each other.

(Action and Effect)

Next, the action and effect of this embodiment will be described.

In this embodiment, the second lens 14 is fitted to the lens holding ring 20 while being received by the lens receiving portions 24AS formed on the inner peripheral surface 24A of the lens holding ring 20. The lens receiving portions 24AS holds the lens portion 15 while being in contact with the lens portion 15 on the inner peripheral surface 24A of the lens holding ring 20 at three or more (twelve) different holding positions P1 in the circumferential direction. Accordingly, the second lens 14 and the lens holding ring 20 are fitted to each other at multiple points that are arranged at intervals in the circumferential direction of the second lens 14. Therefore, since a contact area between the second lens 14 and the lens holding ring 20 is smaller than that in a case where the second lens 14 and the lens holding ring 20 are in complete contact with each other in the circumferential direction, the second lens 14 is easily received in the lens holding ring 20.

Further, even though the lens holding ring 20 is distorted due to a force applied from the lens barrel 18, an insertion force required to assemble the second lens 14 with the lens holding ring 20 can be made smaller than that in a case where the lens is received by the entire circular inner periphery. Accordingly, the second lens 14 can be stably inserted into the lens holding ring 20. Therefore, the assemblability of the second lens 14 can be improved.

Furthermore, in this embodiment, the lens receiving portions 24AS are in line contact with the outer peripheral surface 15A of the lens portion 15. Accordingly, even though the lens holding ring 20 is distorted due to a force applied from the lens barrel 18, resistance to be generated during assembly is made smaller than that in the case of a surface contact structure where the outer periphery of the lens is received by a curved surface. Moreover, since the second lens 14 is in line contact with the lens holding ring 20 in the insertion direction of the second lens 14, the assemblability of the second lens 14 can be improved.

Further, in this embodiment, the lens holding ring 20 is fitted to the lens barrel 18 while being received by the holding ring-receiving portions 18AS formed on the inner peripheral surface 18A of the lens barrel 18. The holding ring-receiving portions 18AS holds the lens holding ring 20 while being in line contact with the lens holding ring 20 at twelve different holding positions P2 in the circumferential direction on the inner peripheral surface 18A of the lens barrel 18. Accordingly, the lens barrel 18 and the lens holding ring 20 are fitted to each other at multiple points that are arranged at intervals in the circumferential direction of the lens holding ring 20. Therefore, since a contact area between the lens barrel 18 and the lens holding ring 20 is smaller than that in a case where the lens barrel 18 and the lens holding ring 20 are in complete contact with each other in the circumferential direction, the lens holding ring 20 is easily received in the lens barrel 18.

Further, even though the lens holding ring 20 is subjected to a force from the lens barrel 18, an insertion force required to assemble the lens holding ring 20 with the lens barrel 18 can be made smaller than that in a case where the lens holding ring 20 is received by the entire circular inner periphery. Accordingly, the assemblability of the lens holding ring 20 can be improved.

Furthermore, in this embodiment, the holding ring-receiving portions 18AS are in line contact with the outer peripheral surface 20A of the lens holding ring 20. Accordingly, resistance to be generated during assembly is made smaller than that in the case of a surface contact structure where the outer periphery of the lens holding ring 20 is received by a curved surface. Further, since the holding ring-receiving portions 18AS are in line contact with the outer peripheral surface 20A in the insertion direction of the lens holding ring 20, the assemblability of the lens holding ring 20 can be improved.

Furthermore, in this embodiment, the holding positions P2 that are fitting portions between the lens barrel 18 and the lens holding ring 20 and the holding positions P1 that are fitting portions between the lens holding ring 20 and the lens portion 15 are arranged at different positions in the circumferential direction. That is, positions where the lens holding ring 20 is subjected to a force applied from the lens barrel 18 and positions where the lens portion 15 is subjected to a force applied from the lens holding ring 20 are shifted from each other. Accordingly, since it is difficult for a force, which is applied from the lens barrel 18, to act on the lens portion 15, resistance to be generated during the assembly of the lens can also be reduced.

Further, the second lens 14 includes the protruding portion 16 that protrudes outward from the lens portion 15 in the radial direction, and the protruding surface 16A is formed on the surface of the protruding portion 16 facing the object side in the optical axis direction. The protruding surface 16A is in contact with the positioning surface 24B of the lens holding ring 20, so that the second lens 14 can be easily positioned relative to the lens holding ring 20 in the optical axis direction.

Further, the contact surface 22A facing the object side is formed on the surface of the lens holding ring 20 opposite to the positioning surface 24B in the optical axis direction. The contact surface 22A is in contact with the first lens 12, so that an interval between the first lens 12 and the second lens 14 can be defined through the lens holding ring 20.

Figure 3:
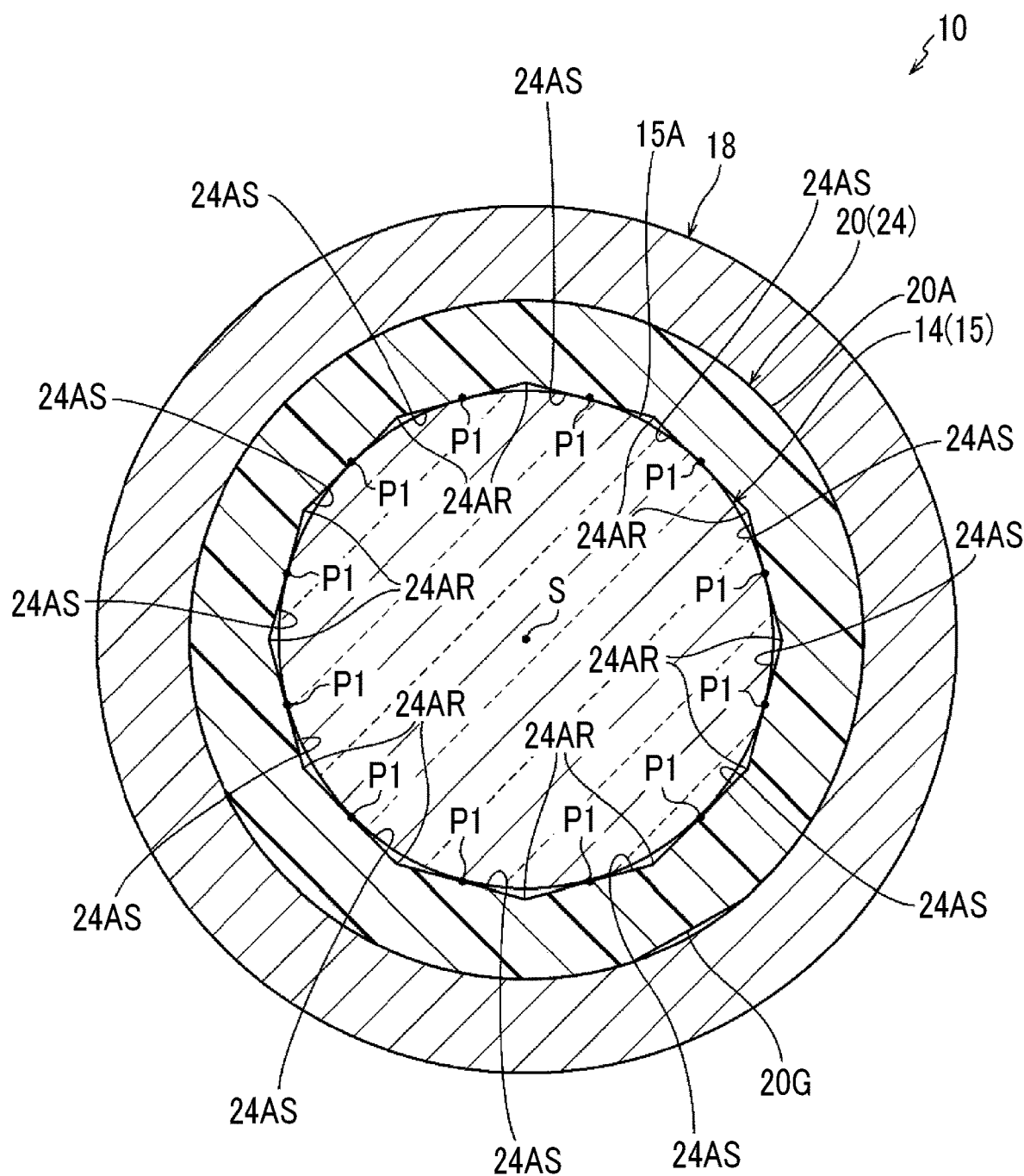
FIG. 3 is a cross-sectional view of a lens unit according to another modification example of the first embodiment viewed in an optical axis direction.

Furthermore, in this embodiment, the inner peripheral surface 18A of the lens barrel 18 is formed in a polygonal shape in a case where the inner peripheral surface 18A is viewed in the optical axis direction. However, the inner peripheral surface 18A of the lens barrel 18 may be formed in a circular shape as shown in FIG. 3 in a case where the inner peripheral surface 18A is viewed in the optical axis direction.

Figure 4:
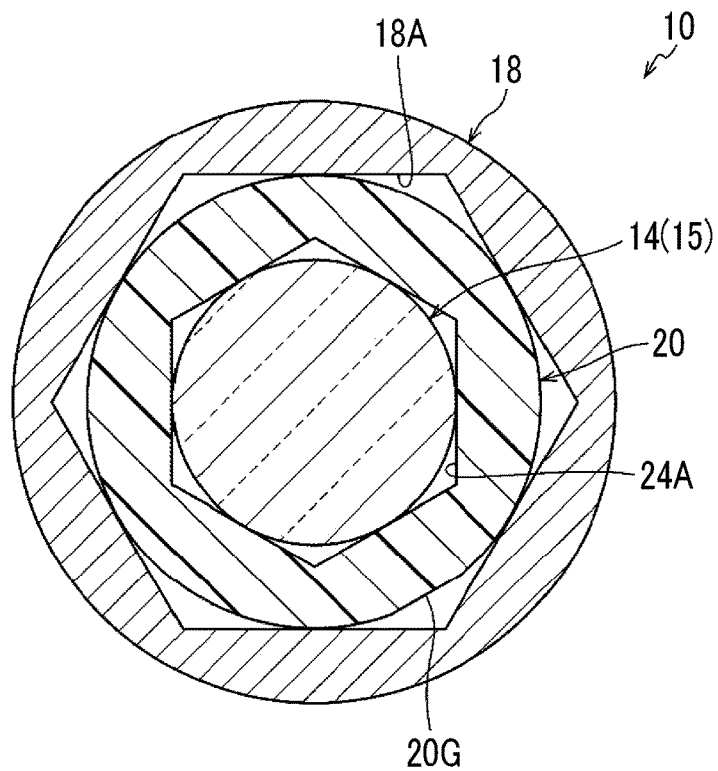
FIG. 4 is a cross-sectional view of a lens unit according to another modification example of the first embodiment viewed in the optical axis direction.

Further, the inner peripheral surface 24A of the lens holding ring 20 is formed in the shape of a regular dodecagon in this embodiment, but may be formed in the shape of a regular hexagon as shown in FIG. 4. In the example shown in FIG. 4, the inner peripheral surface 18A of the lens barrel 18 is also formed in the shape of a regular hexagon.

Figure 5:
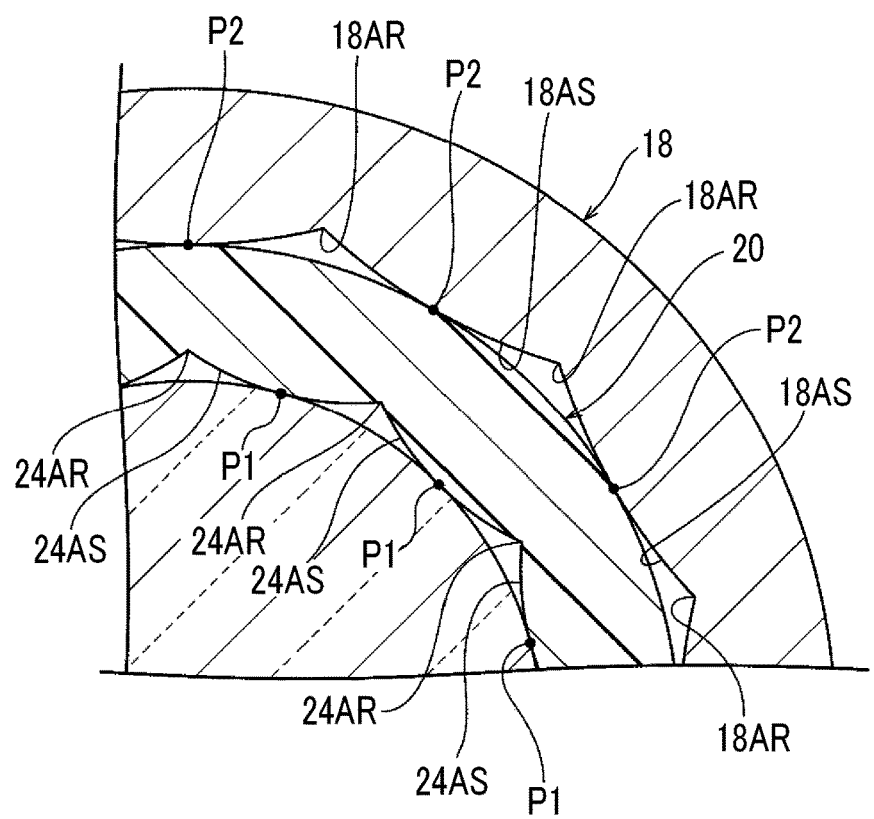
FIG. 5 is a cross-sectional view of a lens unit according to another modification example of the first embodiment viewed in the optical axis direction.

Furthermore, each lens receiving portion 24AS is formed in the shape of a flat surface in this embodiment, but may be formed in a curved shape that is convex inward in the radial direction as shown in FIG. 5.

Second Embodiment

Next, a lens unit 10A of a second embodiment will be described. The same components as those of the first embodiment will be denoted by the same reference numerals as those of the first embodiment and the description thereof will be omitted. A gate mark formed on a lens holding ring 20 is not shown in this embodiment.

The lens unit 10A of this embodiment is different from the first embodiment in terms of the shape of the inner peripheral surface of a lens holding ring 20 and the shape of the inner peripheral surface of a lens barrel 18.

Figure 6:
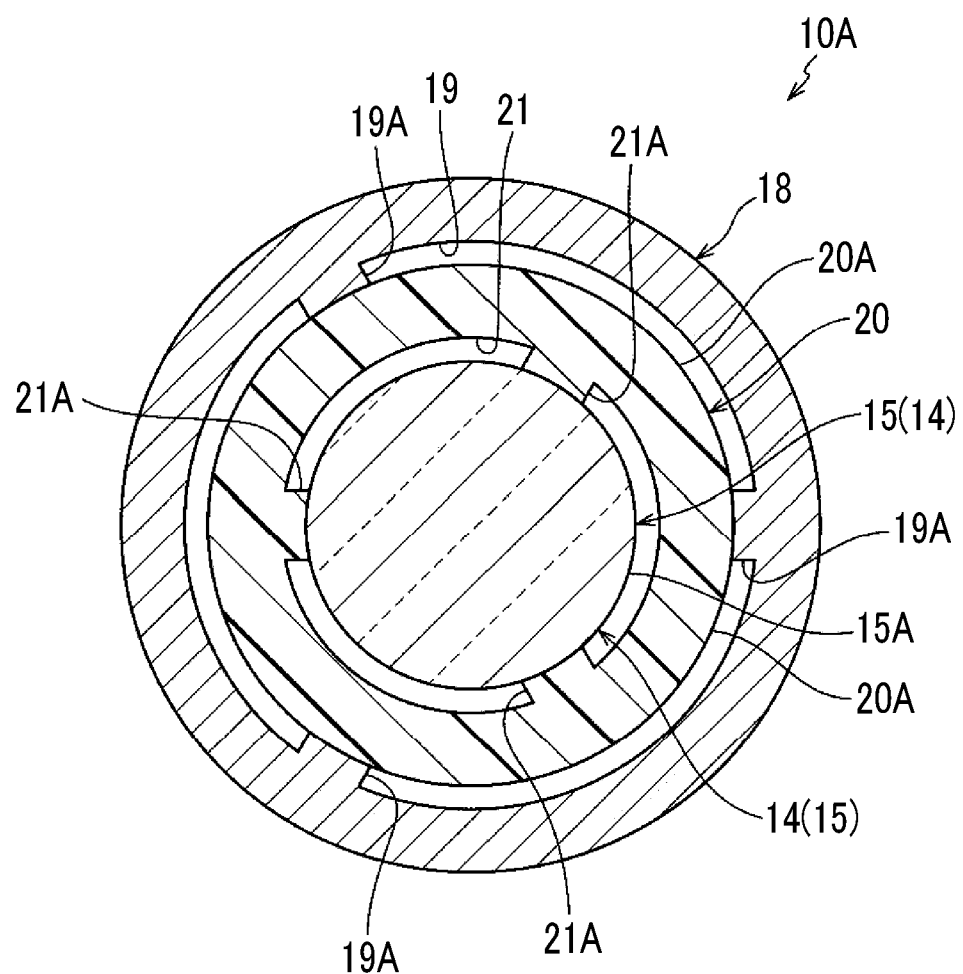
FIG. 6 is a cross-sectional view of a lens unit according to a second embodiment viewed in an optical axis direction.

As shown in FIG. 6, lens receiving portions 21A, which protrude inward from an inner peripheral wall 21 in a radial direction, are formed on the inner periphery of the lens holding ring 20. The lens receiving portions 21A include contact surfaces, which are curved along the outer peripheral surface 15A of the lens portion 15, extend in the optical axis direction, and are formed at a plurality of positions (three positions in this embodiment) at regular intervals in the circumferential direction. The outer periphery of the lens portion 15 is fitted into the lens holding ring 20 while being received by the lens receiving portions 21A at three positions in the circumferential direction.

Holding ring-receiving portions 19A, which protrude inward from an inner peripheral wall 19 in the radial direction, are formed on the inner periphery of the lens barrel 18. The holding ring-receiving portions 19A include contact surfaces, which are curved along the outer peripheral surface 20A of the lens holding ring 20, extend in the optical axis direction, and are formed at a plurality of positions (three positions in this embodiment) at regular intervals in the circumferential direction. The holding ring-receiving portions 19A are arranged at positions different from the positions of the lens receiving portions 21A in the circumferential direction, and one holding ring-receiving portion 19A is disposed between the two adjacent lens receiving portions 21A in this embodiment. The outer periphery of the lens holding ring 20 is fitted into the lens barrel 18 while being received by the holding ring-receiving portions 19A at three positions in the circumferential direction.

Next, the action and effect of this embodiment will be described.

In this embodiment, the second lens 14 is fitted to the lens receiving portions 21A formed on the inner peripheral wall 21 of the lens holding ring 20 at multiple points that are arranged at intervals in the circumferential direction as in the first embodiment. Accordingly, since a contact area between the second lens 14 and the lens holding ring 20 is smaller than that in a case where the second lens 14 and the lens holding ring 20 are in complete contact with each other in the circumferential direction, the second lens 14 is easily received in the lens holding ring 20.

Further, even though the lens holding ring 20 is distorted due to a force applied from the lens barrel 18, an insertion force required to assemble the second lens 14 with the lens holding ring 20 can be reduced. Accordingly, the second lens 14 can be stably inserted into the lens holding ring 20. Therefore, the assemblability of the second lens 14 can be improved.

Furthermore, since the lens receiving portions 21A extend in the insertion direction of the second lens 14 in this embodiment, the assemblability of the second lens 14 can be improved.

Moreover, in this embodiment, the lens holding ring 20 is fitted to the holding ring-receiving portions 19A formed on the inner peripheral wall 19 of the lens barrel 18 at multiple points that are arranged at intervals in the circumferential direction of the lens holding ring 20 as in the first embodiment. Accordingly, since a contact area between the lens holding ring 20 and the lens barrel 18 is smaller than that in a case where the lens holding ring 20 and the lens barrel 18 are in complete contact with each other in the circumferential direction, the lens holding ring 20 is easily received in the lens barrel 18.

Further, even though the lens holding ring 20 is subjected to a force applied from the lens barrel 18, an insertion force required to assemble the lens holding ring 20 with the lens barrel 18 can be made smaller than that in a case where the lens holding ring 20 is received by the entire circular inner periphery. Accordingly, the assemblability of the lens holding ring 20 can be improved.

Furthermore, since fitting portions between the lens barrel 18 and the lens holding ring 20 and fitting portions between the lens holding ring 20 and the lens portion 15 are arranged at different positions in the circumferential direction, it is difficult for a force, which is applied from the lens barrel 18, to act on the lens portion 15 even in this embodiment. Accordingly, resistance to be generated during the assembly of the lens can also be reduced.

Figure 7:
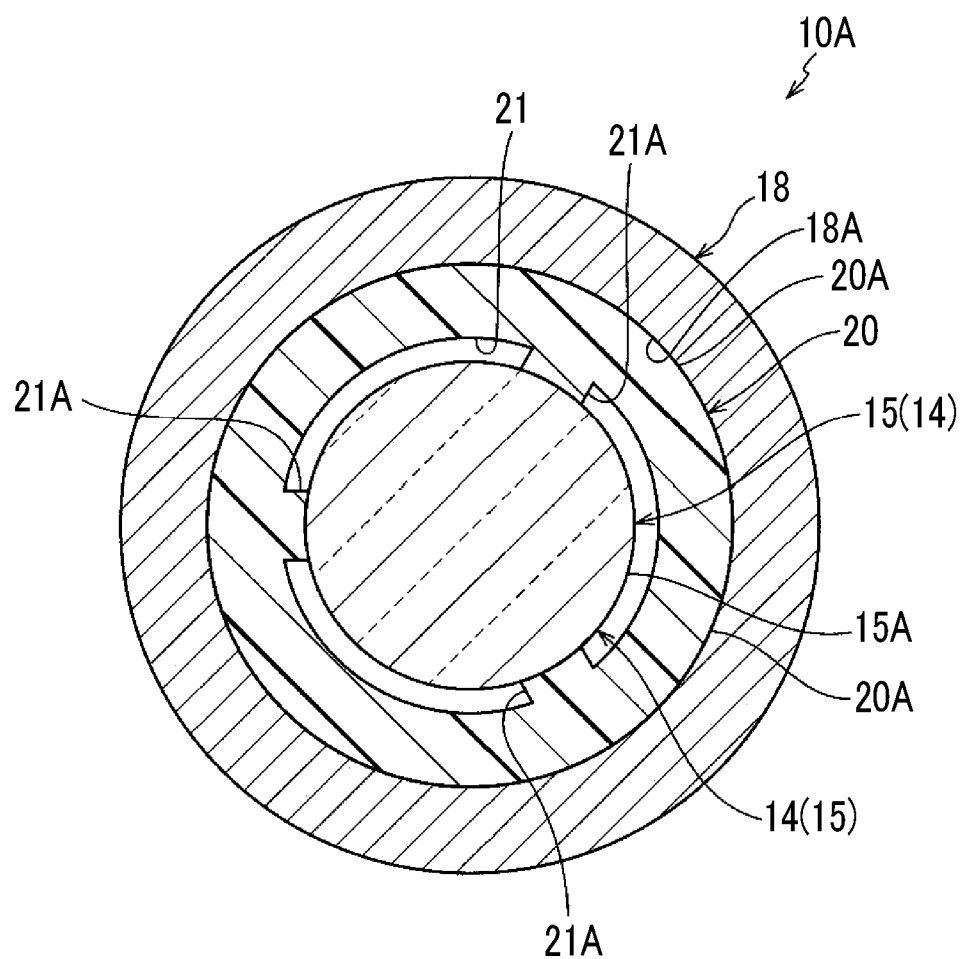
FIG. 7 is a cross-sectional view of a lens unit according to a modification example of the second embodiment viewed in the optical axis direction.

The holding ring-receiving portions 19A are formed on the inner peripheral surface 18A of the lens barrel 18 in this embodiment, but the inner peripheral surface 18A of the lens barrel 18 may be formed in a circular shape as shown in FIG. 7 in a case where the inner peripheral surface 18A is viewed in the optical axis direction.

Figure 8:
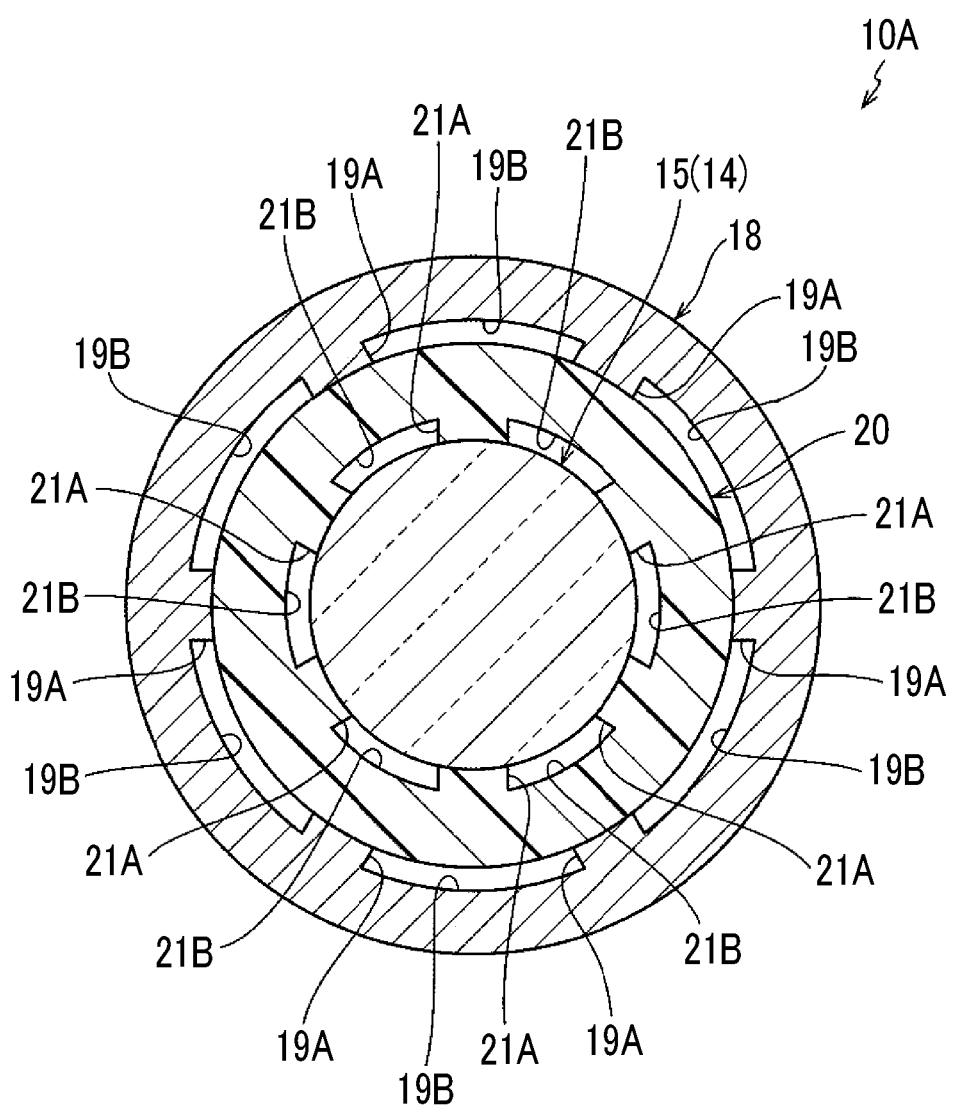
FIG. 8 is a cross-sectional view of a lens unit according to another modification example of the second embodiment viewed in the optical axis direction.

Further, the lens receiving portions 21A are provided at three positions in this embodiment, but may be provided at four or more positions without being limited to three positions. FIG. 8 shows a case where the lens receiving portions 21A are provided at six positions. Furthermore, as shown in FIG. 8, the lens receiving portions 21A do not protrude inward from the inner peripheral wall 21 in the radial direction and can also be formed by forming grooves 21B on the inner peripheral wall 21. Likewise in regard to the holding ring-receiving portions 19A of the lens barrel 18, the holding ring-receiving portions 19A can be formed by forming grooves 19B on the inner peripheral wall 19.

Third Embodiment

Next, a lens unit 30 of a third embodiment will be described. The same components as those of the first and second embodiments will be denoted by the same reference numerals as those of the first embodiment and the description thereof will be omitted.

Figure 9:
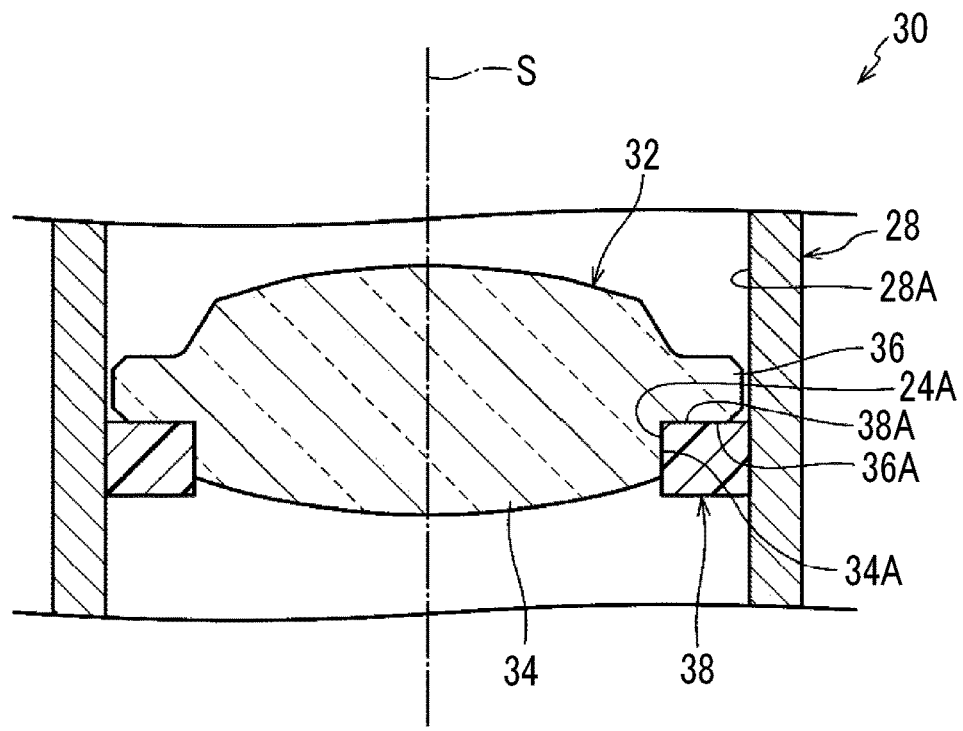
FIG. 9 is a longitudinal sectional view showing main components of a lens unit according to a third embodiment.

As shown in FIG. 9, the lens unit 30 of this embodiment includes a third lens 32, a lens barrel 28 that receives the third lens 32, and a lens holding ring 38 that holds the third lens 32. Further, a plurality of lenses are received in the lens barrel 28 separately from the third lens 32, so that an optical system is formed. Furthermore, an upper side in FIG. 9 is an object side and a lower side in FIG. 9 is an image side.

(Structure of Lens)

The third lens 32 includes a lens portion 34 and a protruding portion 36. The lens portion 34 forms the optical surface of the third lens 32, and the surface of the lens portion 34 facing the object side is curved to be convex and the surface of the lens portion 34 facing the image side is curved to be convex. The protruding portion 36 protrudes outward in a radial direction from a middle portion of the lens portion 34 in the optical axis direction, and includes a protruding surface 36A facing the image side. An outer peripheral surface 34A is formed on the outer periphery of a portion of the lens portion 34 that is closer to the image side than the protruding portion 36. The lens portion 34 and the protruding portion 36 are formed integrally with each other.

(Structure of Lens Holding Ring)

The lens holding ring 38 is formed in the shape of a ring of which both end portions in the optical axis direction are opened, and is formed by resin molding. The lens holding ring 38 is formed in a shape that includes only the holding portion 24 of the first embodiment without including the interval defining portion 22. The lens holding ring 38 can be made of the same material as that of the first embodiment. A positioning surface 38A, which faces the object side, is formed on the surface of the lens holding ring 38 facing the object side. The positioning surface 38A is in contact with the protruding surface 36A.

As with the holding portion 24 of the first embodiment, an inner peripheral surface 24A of the lens holding ring 38 is formed in a polygonal shape in a case where the inner peripheral surface 24A is viewed in the optical axis direction and includes twelve lens receiving portions 24AS, and a corner 24AR is formed between the adjacent lens receiving portions 24AS. The lens portion 34 is fitted into the lens holding ring 38 as with the lens portion 15 of the first embodiment.

The lens holding ring 38 and the third lens 32 are received in the lens barrel 28. The lens holding ring 38 is fitted into the lens barrel 28 in a state where the lens portion 34 is fitted into the lens holding ring 38. The lens receiving portions 24AS of the lens holding ring 38 and holding ring-receiving portions 28AS of the lens barrel 28 are arranged at different positions (shifted positions) in the circumferential direction.

The positioning surface 38A of the lens holding ring 38 is in contact with the surface of the third lens 32 facing the image side. The outer peripheral surface of the protruding portion 36 of the third lens 32 and an inner peripheral surface 28A of the lens barrel 28 are spaced from each other.

(Action and Effect)

Next, the action and effect of this embodiment will be described.

In this embodiment, the third lens 32 is fitted to the lens receiving portions 24AS formed on the inner peripheral surface 24A of the lens holding ring 38 at multiple points that are arranged at intervals in the circumferential direction of the third lens 32 as in the first embodiment. Accordingly, the assemblability of the third lens 32 can be improved as in the first embodiment.

Further, in this embodiment, the lens holding ring 38 is fitted to the holding ring-receiving portions 28AS formed on the inner peripheral surface 28A of the lens barrel 28 at multiple points that are arranged at intervals in the circumferential direction of the lens holding ring 38 as in the first embodiment. Accordingly, the assemblability of the lens holding ring 38 can be improved as in the first embodiment.

Furthermore, the protruding surface 36A of the third lens 32 is in contact with the positioning surface 38A of the lens holding ring 38, so that the third lens 32 can be easily positioned relative to the lens holding ring 38 in the optical axis direction.

The inner periphery of the lens holding ring 38 and the inner periphery of the lens barrel 28 are formed to have the same structures as those of the first embodiment in this embodiment, but the inner periphery of the lens holding ring 38 and the inner periphery of the lens barrel 28 may be formed to have the same structures as those of the second embodiment.

Fourth Embodiment

Next, a lens unit 40 of a fourth embodiment will be described. The same components as those of the first, second, and third embodiments will be denoted by the same reference numerals as those of the first, second, and third embodiments and the description thereof will be omitted.

Figure 10:
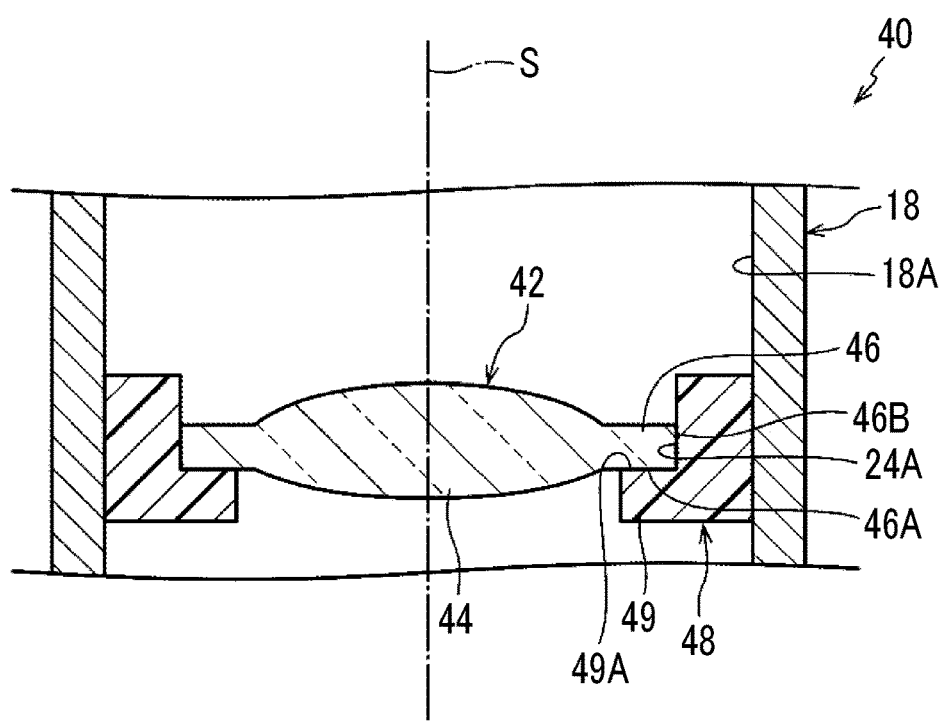
FIG. 10 is a longitudinal sectional view showing main components of a lens unit according to a fourth embodiment.

As shown in FIG. 10, the lens unit 40 of this embodiment includes a lens barrel 18 that receives a fourth lens 42 and a lens holding ring 48 that holds the fourth lens 42. Further, a plurality of lenses are received in the lens barrel 18 separately from the fourth lens 42, so that an optical system is formed. Furthermore, an upper side in FIG. 10 is an object side and a lower side in FIG. 10 is an image side.

(Structure of Lens)

The fourth lens 42 includes a lens portion 44 and a protruding portion 46. The lens portion 44 forms the optical surface of the fourth lens 42, and the surface of the lens portion 44 facing the object side is curved to be convex and the surface of the lens portion 44 facing the image side is curved to be convex. The protruding portion 46 protrudes outward in the radial direction of the lens portion 44, and includes a protruding surface 46A facing the image side. Further, an outer peripheral surface 46B is formed on the outer periphery of the protruding portion 46. The lens portion 44 and the protruding portion 46 are formed integrally with each other.

(Structure of Lens Holding Ring)

The lens holding ring 48 is formed in the shape of a ring of which both end portions in the optical axis direction are opened, and is formed by resin molding. The lens holding ring 48 includes an inner projecting portion 49 that is provided at an inner portion thereof facing the image side. The inner projecting portion 49 is formed of a projecting strip that is convex toward the inside of an inner peripheral surface 24A of the lens holding ring 48 in the radial direction, and a positioning surface 49A facing the object side is formed on the inner projecting portion 49. The positioning surface 49A is in contact with the protruding surface 46A.

As with the holding portion 24 of the first embodiment, the inner peripheral surface 24A of the lens holding ring 48 is formed in a polygonal shape in a case where the inner peripheral surface 24A is viewed in the optical axis direction and includes lens receiving portions 24AS, and a corner 24AR is formed between the adjacent lens receiving portions 24AS. The fourth lens 42 is fitted into the lens holding ring 48 in a state where the outer peripheral surface 46B is in contact with the respective lens receiving portions 24AS and is linearly received by the lens receiving portions 24AS.

The lens holding ring 48 and the fourth lens 42 are received in the lens barrel 18. The lens holding ring 48 is fitted into the lens barrel 18 in a state where the fourth lens 42 is fitted into the lens holding ring 48. The lens receiving portions 24AS of the lens holding ring 48 and holding ring-receiving portions 18AS of the lens barrel 18 are arranged at different positions (shifted positions) in the circumferential direction.

(Action and Effect)

Next, the action and effect of this embodiment will be described.

In this embodiment, the fourth lens 42 is fitted to the lens receiving portions 24AS formed on the inner peripheral surface 24A of the lens holding ring 48 at multiple points that are arranged at intervals in the circumferential direction of the fourth lens 42 as in the first embodiment. Accordingly, the assemblability of the fourth lens 42 can be improved as in the first embodiment.

Further, in this embodiment, the lens holding ring 48 is fitted to the holding ring-receiving portions 18AS formed on the inner peripheral surface 18A of the lens barrel 18 at multiple points that are arranged at intervals in the circumferential direction of the lens holding ring 48 as in the first embodiment. Accordingly, the assemblability of the lens holding ring 48 can be improved as in the first embodiment.

Furthermore, the protruding surface 46A of the fourth lens 42 is in contact with the positioning surface 49A of the lens holding ring 48, so that the fourth lens 42 can be easily positioned relative to the lens holding ring 48 in the optical axis direction.

The inner periphery of the lens holding ring 48 and the inner periphery of the lens barrel 18 are formed to have the same structures as those of the first embodiment in this embodiment, but the inner periphery of the lens holding ring 48 and the inner periphery of the lens barrel 18 may be formed to have the same structures as those of the second embodiment.

Further, even in a case where the lens units according to the first to fourth embodiments are used in an environment where it is difficult to maintain image formation performance, such as an environment where the lens unit is exposed to high temperature, the performance degradation of the lens units can be reduced. Accordingly, the lens units according to the first to fourth embodiments are suitable for cameras, which are likely to be exposed to high temperature, such as a monitoring camera and an in-vehicle camera. A monitoring lens unit is a lens unit that is provided in a building or the like and is used to capture the images of surrounding objects and the like. An in-vehicle lens unit is a lens unit that is provided in a vehicle (mainly, a vehicle cabin) and is used to capture the images of objects and the like outside the vehicle.

The entire content of the disclosure of Japanese Patent Application No. 2016-185882, filed Sep. 23, 2016, is incorporated in this specification by reference.

All documents, a patent application, and a technical standard disclosed in this specification are incorporated in this specification by reference so that the incorporation of each document, the patent application, and the technical standard by reference is specific and is as detailed as each document, the patent application, and the technical standard.

What is claimed is:

1. A lens unit comprising:
   a lens that is received in a lens barrel; and
   a lens holding ring that is-formed in a shape of a ring, is fitted to an inner periphery of the lens barrel, includes lens receiving portions formed on an inner peripheral wall thereof at three or more different positions in a circumferential direction, and allows the lens to be fitted to an inner periphery thereof while the lens is received by the lens receiving portions,
   wherein the lens includes a lens portion and a protruding portion, an outer periphery of the lens portion is fitted to the lens receiving portions of the lens holding ring and the protruding portion is protruded outward from the lens portion in a radial direction, and
   wherein a positioning surface formed on the lens holding ring is in contact with the protruding portion in an optical axis direction.

2. The lens unit according to claim 1,
   wherein a contact surface, which is in contact with an adjacent member adjacent to the lens holding ring in the optical axis direction and defines an interval between the adjacent member and the lens, is formed on a surface of the lens holding ring opposite to the positioning surface in the optical axis direction.

3. The lens unit according to claim 1,
   wherein a thermal expansion coefficient of the lens holding ring in the optical axis direction is lower than a thermal expansion coefficient of the lens holding ring in a direction orthogonal to an optical axis.

4. The lens unit according to claim 1, wherein the lens holding ring is made of a resin containing inorganic fiber.

5. The lens unit according to claim 1, wherein the inner periphery of the lens barrel and an outer periphery of the lens holding ring are in contact with each other at three or more different positions in the circumferential direction.

6. The lens unit according to claim 1, wherein an inner peripheral wall of the lens barrel is formed in a polygonal shape in a case where the inner peripheral wall of the lens barrel is viewed in the optical axis direction.

7. The lens unit according to claim 1, wherein the lens receiving portions and fitting positions where the inner periphery of the lens barrel and the lens holding ring are fitted to each other are arranged at different positions in the circumferential direction.

8. The lens unit according to claim 1, wherein the lens barrel is made of a resin containing inorganic fiber.

9. The lens unit according to claim 1, wherein the lens unit is an in-vehicle lens unit or a monitoring lens unit.

10. The lens unit according to claim 1, wherein a gap is formed between the lens portion of the lens and any two adjacent lens receiving portions in the circumferential direction.

11. The lens unit according to claim 1, wherein the protruding portion and the lens barrel are spaced from each other.

12. A lens unit comprising:
a lens that is received in a lens barrel; and
a lens holding ring that is formed in a shape of a ring, is fitted to an inner periphery of the lens barrel, includes lens receiving portions formed on an inner peripheral wall thereof at three or more different positions in a circumferential direction, and allows the lens to be fitted to an inner periphery thereof while the lens is received by the lens receiving portions,
wherein the lens includes a lens portion and a protruding portion, an outer periphery of the lens portion is fitted to the lens receiving portions of the lens holding ring and the protruding portion is protruded outward from the lens portion in a radial direction,
wherein a positioning surface formed on the lens holding ring is in contact with the protruding portion in an optical axis direction, and
wherein the inner peripheral wall of the lens holding ring is formed in a polygonal shape in a case where the inner peripheral wall of the lens holding ring is viewed in the optical axis direction.

13. A lens unit comprising:
a lens that is received in a lens barrel; and
a lens holding ring that is formed in a shape of a ring, is fitted to an inner periphery of the lens barrel, includes lens receiving portions formed on an inner peripheral wall thereof at three or more different positions in a circumferential direction, and allows the lens to be fitted to an inner periphery thereof while the lens is received by the lens receiving portions,
wherein the lens includes a lens portion and a protruding portion, an outer periphery of the lens portion is fitted to the lens receiving portions of the lens holding ring and the protruding portion is protruded outward from the lens portion in a radial direction,
wherein a positioning surface formed on the lens holding ring is in contact with the protruding portion in an optical axis direction, and
wherein the lens holding ring is made of a resin containing inorganic fiber, the lens holding ring includes a gate mark for molding, and the lens receiving portions are arranged at positions symmetric with respect to the gate mark in the circumferential direction.

* * * * *